United States Patent [19]
Brajder

[11] 4,439,806
[45] Mar. 27, 1984

[54] SHORT-CIRCUIT PROTECTION DEVICE FOR A DC CONTROL ELEMENT

[75] Inventor: Antonio Brajder, Erlangen, Fed. Rep. of Germany

[73] Assignee: Siemens Aktiengesellschaft, Munich, Fed. Rep. of Germany

[21] Appl. No.: 354,929

[22] Filed: Mar. 5, 1982

[30] Foreign Application Priority Data

Mar. 12, 1981 [DE] Fed. Rep. of Germany ....... 3109482

[51] Int. Cl.³ .................. H02H 3/08; H02H 7/20; H02H 7/10
[52] U.S. Cl. ......................... 361/98; 361/94; 361/31; 363/55; 363/56; 363/58; 363/50
[58] Field of Search ............ 361/98, 93, 94, 100, 361/31, 23, 30, 95, 96; 363/55, 56, 50, 58, 52, 53, 132; 330/207 P, 298

[56] References Cited
U.S. PATENT DOCUMENTS 3,976,919 8/1976 Vandevier et al. ............. 361/100 X
4,017,781 4/1977 Müller .................. 363/56 X
4,047,235 9/1977 Davis .................. 361/100
4,290,000 9/1981 Sun .................. 361/30 X Primary Examiner—Patrick R. Salce
Attorney, Agent, or Firm—Kenyon & Kenyon

[57] ABSTRACT

A short-circuit protection device for a DC control element has at least one transistor which is addressed by timing pulses obtained by comparison of a triangular voltage with a control voltage. Each such transistor is provided with a separate overcurrent protection device which, after a short circuit, blocks the associated transistor until the beginning of a new switching-on pulse. The control voltage assumes values which are above the maximum value of the triangular voltage.

In the event of a short circuit, the transistor concerned is switched off very fast, but is switched on again by the next succeeding switching-on pulse and a determination is made as to whether the short circuit is still present. If the control voltage rises to values which are above the maximum value of the triangular voltage because the actual value of the load current deviates heavily from the reference value due to the disconnection of the transistors, the transistors remain switched off until the DC control element is restored to operation by external intervention.

3 Claims, 2 Drawing Figures

SHORT-CIRCUIT PROTECTION DEVICE FOR A DC CONTROL ELEMENT

BACKGROUND OF THE INVENTION

This invention relates to a circuit for protecting a DC control element from short circuits. More particularly, the invention relates to a protection circuit for a control element having at least one transistor which is driven by timing pulses obtained by comparison of a control voltage with a voltage having a triangular wave form.

In one known commercially available equipment, the load current of a DC control element is monitored by a current-measuring device in the load circuit; current in the DC control element is stopped as soon as the load current exceeds a predetermined maximum value. This does not result in short-circuit protection for all cases, since not every short-circuit current in the circuit flows through the current-measuring device in the load circuit. Thus, in DC control elements having a bridge ciruit, the currents caused by a short circuit in a bridge arm, for instance, are not detected. In addition, shorts to ground cannot be reliably recognized. Immediate disconnection after an overcurrent results in the DC control element being definitely put out of operation after only one occurrence of an overcurrent. The system is, thus, sensitive to interference.

An overload protection device for individual transistors is described in the literature reference etz-b, vol. 30 (1978), no. 26, page 1065. There the transistor to be protected is monitored for overcurrent. If desaturation occurs, the transistor is switched off. A newly arriving "on" pulse is coupled via a capacitor to the transistor and switches the latter on again.

It is an object of the present invention to provide a short-circuit protection device of the type mentioned at the outset in which short circuits are detected with certainty and in which the DC control element is shut off only when a short circuit prevails over an extended period of time. Short circuits are to be understood in the following to include those shorts to ground which lead to overcurrents in the transistors of the DC control element.

SUMMARY OF THE INVENTION

According to the present invention, the above problem is solved by providing each transistor with a separate overload protection device which, in the event of an overcurrent, cuts the transistor off and keeps it off until the start of a new switching-on pulse and by allowing the control voltage to assume values which are above the maximum value of the triangular voltage.

In a circuit made in accordance with the the invention, every short-circuit, including those shorts to ground which lead to an overcurrent, is detected. In the event of a short circuit, the transistor concerned is switched off very quickly and remains off as long as the switching-on pulse is present. However, it is switched on again by the following switching-on pulse; a check is thus made as to whether the short circuit still prevails. Only when a short circuit prevails after several switching-on pulses is the DC control element finally switched out of use. The short circuit protection afforded by the invention is thus insensitive to short-time disturbances which simulate a short circuit in the load circuit or in the current measuring circuit.

Advantageously, the actual value and a reference value for the DC control circuit load current are fed to a comparison stage whose output is connected to a trouble alarm device. Since, after the short circuit protection device has responded, the actual value of the load current goes to zero but the reference value is retained at its original magnitude, the comparison stage responds and indicates the presence of a short circuit. In this way, the need for providing an indication from each individual over-current protection device is avoided.

The output of the comparison stage is advantageously connected via a delay stage to a disconnecting device for the DC control element. The comparison stage can be set to respond some time after the occurrence of the short circuit, namely, when a considerable deviation between the reference value and the actual value of the load current has occurred. The voltage is then completely removed from the DC control element by the disconnecting device. The disconnecting device thus effectively protects each individual transistor in the short-circuit protection device.

DETAILED DESCRIPTION OF THE INVENTION

Figure 1:
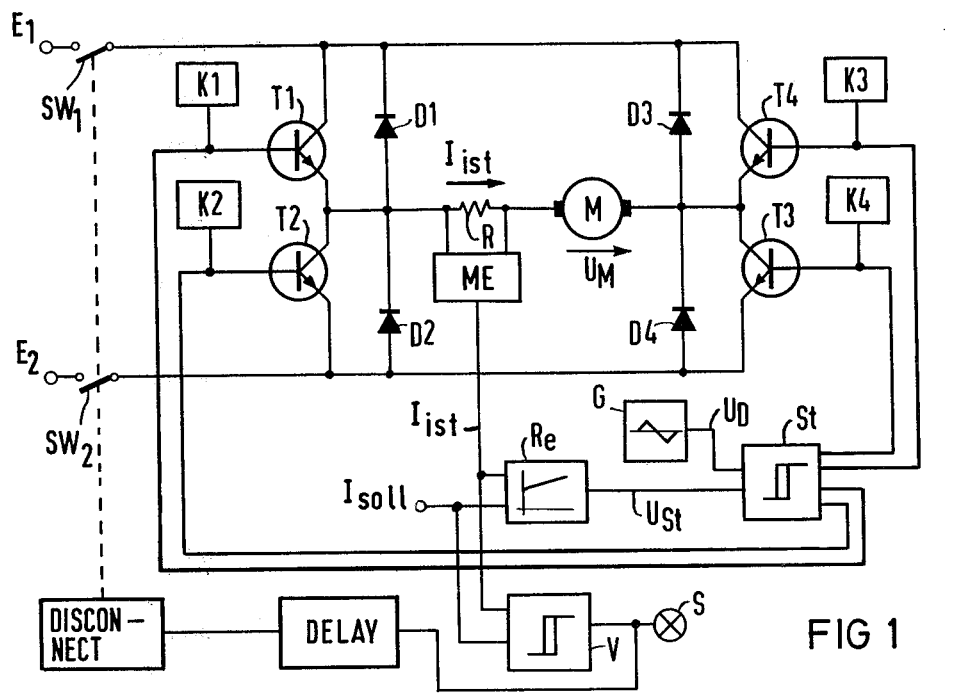
FIG. 1 is a schematic diagram of a DC control circuit employing transistors which are protected against short circuit overcurrents in accordance with the invention.

FIG. 1 shows the schematic circuit diagram of a DC control circuit having the short-circuit protection afforded by the invention. Four transistors T1 to T4 are arranged in a bridge circuit between two input terminals E1, E2. Each transistor T1 to T4 is shunted by a bypass diode D1 to D4. Motor M is arranged as the load in the bridge diagonal.

The actual value of the load current $I_{ist}$ is determined by resistor R connected in series with motor M and is converted in measuring device ME into a measurement variable $I_{ist}'$ which is proportional to the actual current $I_{ist}$. This measurement value is fed, together with a value for the reference current $I_{soll}$, to controller $R_e$ which forms a control voltage $U_{St}$ from the difference (control deviation). Control voltage $U_{St}$ is compared in control unit St with a triangular voltage $U_D$ furnished by triangle generator G. Depending on whether the instantaneous value of the triangular voltage $U_D$ is larger or smaller than the control voltage $U_{St}$, control pulses for the transistors T1 to T4 are derived by the control unit St in a manner to be explained below.

Figure 2:
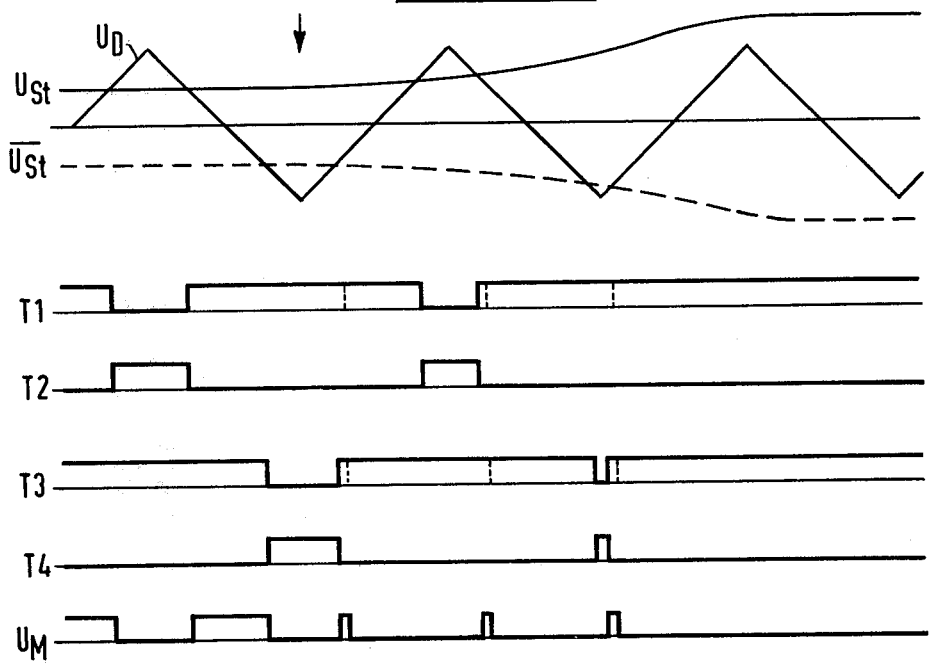
FIG. 2 shows control wave forms used in the circuit of FIG. 1.

FIG. 2 shows the waveforms for the control voltage $U_{St}$, for the triangular voltage $U_D$, for the drive pulses of transistors T1 to T4, and for the voltage $U_M$ present across motor M when it is in undisturbed operation. The triangular voltage $U_D$, which is symmetrical to the base (zero) line, is compared with control voltage $U_{St}$ and with inverted control voltage $\overline{U}_{St}$.

In this illustrative embodiment of the invention, transistor T1 is switched on as long as the triangular voltage $U_D$ is less than the control voltage $U_{St}$; transistor T2 is switched on as long as the triangular voltage $U_D$ is higher than the control voltage $U_{St}$; transistor T3 is switched on as long as the triangular voltage $U_D$ is above the inverted control voltage $\overline{U}_{St}$; and transistor T4 is switched on as long as the triangular voltage $U_D$ is below the inverted control voltage $\overline{U}_{St}$. A positive voltage $U_M$ is present at motor M when the transistor T1 and T3 are switched on together. The RMS value of the motor voltage $U_M$ can thus be influenced by the control voltage $U_{St}$ and reaches its maximum when the absolute value of control voltage $U_{St}$ becomes equal to the maximum value of triangular voltage $U_D$. When this occurs, the transistors T1 to T3 are conducting continuously.

To protect the DC control element from short circuits and shorts to ground, each of the four transistors T1 to T4 is equipped with an overload protection device K1 to K4 of its own, as indicated schematically in FIG. 1. Each of the overload protection devices K1 to K4 disconnects the transistors T1 to T4 associated with it quickly if an overcurrent occurs therein. Each overload protection device which has tripled, their continues to block the associated transistor T1 to T4 until a new switching-on pulse arrives. Any transistor T1 to T4 which has been switched off by its overload protection device can therefore not be switched again during the same switching-on pulse in which an overcurrent has occurred. However, when the switching-on pulse during which the overcurrent occurred disappears and is followed by a new switching-on pulse, the respective transistor is switched on again. If the short circuit continues, the respective protection device K1 to K4 switches off again.

A short circuit overload protection device which behaves as just described is shown, for instance, in the literature reference already mentioned at the outset, etz-b, vol. 30 (1978), no. 26, page 1065. There, the transistor to be protected is monitored for desaturation. If desaturation occurs, the transistor is switched off. A newly occurring drive pulse is coupled to the transistor via a capacitor and switches the transistor on again. Other short-circuit protection devices can also be used, of course, if they exhibit the described behavior. Such a short circuit protection device can be made self-latching (self-holding) for the duration of a switching-on pulse, with the latching cancelled when the switching-on pulse has disappeared.

In the circuit just described, every transistor T1 to T4 is switched on again by each newly occurring switching-on pulse and is quickly switched off again if the short circuit is still present. To stress transistors T1 to T4 in this way is permissible, however, only for a limited number of switching-on actions. Taking into account the stress on the transistors, on the one hand, and the insensitivity to interference, on the other hand, the transistors can be protected if they remain permanently switched off when the short circuit persists after two to three switching-on pulses.

This is achieved when the control voltage $U_{St}$ is not limited, as was customary up to now, to values below the maximum value of the triangular wave, but is also permitted to rise beyond the maximum value of the triangular wave voltage $U_D$. Then, in the event of a short circuit, the DC control element is automatically switched off after several switching-on pulses. This will be explained in the following, making reference to the pulse diagram of FIG. 2.

If, after a short circuit, the start of which is marked by an arrow in FIG. 2, one or more respective transistors T1 to T4 is switched off by the associated overload protection device before the end of its existing switching-on pulse, voltage pulses $U_M$, which have a duration considerably shorter than that of normal pulses, are obtained. As a result, the actual current $I_{ist}$ through the motor decays, so that the difference between actual current $I_{ist}$ and reference current $I_{soll}$ increases. The controller Re attempts to compensate for this by increasing control voltage $U_{St}$, as is shown in the upper part of FIG. 2. If the magnitude of control voltage $U_{St}$ exceeds the maximum value of the triangular voltage, a switching-on pulse is continuously present at each transistor T1 and T3, while transistors T2 and T4 no longer receive switching-on pulses. Transistors T1 and T3 are switched off by the overload protection devices K1 to K3 associated with them and are not switched on again, because no new switching-on pulse occurs or because the then present switching-on pulse continues.

With the circuit arrangement just described, therefore, after a short circuit, the drive for transistors T1 to T4 is initially maintained for several periods (in the example shown for three periods), before the DC control element is put out of operation completely. Thus a brief disturbance has been prevented from interrupting the operation. This behavior, which is advantageous for the operation, is achieved without excessive cost for components. In particular, no acknowledgement is necessary from individual short-circuit protection devices K1 to K4, which are all at different potentials, and the need for elaborate measures for potential separation is obviated. By predetermining the rate of rise of control voltage $U_{St}$, which depends on the inductance of the motor and the integration time of controller Re, the number of switching pulses which can occur before transistors T1 to T4 are switched off definitively can be established. A DC control element which has been shut off after a short circuit lasting several periods, can be put in operation again, for instance, by resetting the reference value.

The circuit of FIG. 1 also contains a comparison stage V to which measurement signal $I_{ist}'$ and reference current $I_{soll}$ are fed. Comparison stage V delivers a signal when the difference between the reference current $I_{soll}$ and the measured value of the actual current $I_{ist}'$ falls outside a given tolerance band. This signal is fed to trouble alarm devices. Since a response of the short-circuit protection device always leads to a considerable deviation between the actual current $I_{ist}$ and the reference current $I_{soll}$, the presence of a short circuit is reliably indicated by this simple monitoring device without need for separate indication(s) from individual short-circuit protection devices K1 to K4. The output signal of the comparison stage is also fed to disconnecting device DIS which, in the event of a short circuit, disconnects the control element from the supply voltage by means of switch contacts $SW_1$, $SW_2$.

What is claimed is:

1. A circuit for protecting a DC control element from short-circuits, the DC control element including at least one transistor having an input for timing pulses, comprising:

a. a controlllor having as inputs a desired current and the actual load current of the DC control element and providing an output which is a control voltage proportional to the difference therebetween;

b. a comparison stage having as inputs a triangular voltage having a predetermined maximum value and said control voltage, said control voltage being permitted to assume values greater than said predetermined maximum value, said comparison stage providing timing outputs existing for a duration corresponding to the duration over which said triangular voltage exceeds said control voltage, said timing pulses being provided to the inputs of each transistor in said DC control element; and c. an overload protection device for each transistor, each overload protection device coupled to the respective transistor and having timing pulses from said comparison stage as an input, each overload protection device responsive to an overcurrent in the transistor to block the transistor and keep it blocked until the start of a new timing pulse, whereby in the case of an overload, said control voltage will exceed said maximum value of said triangular voltage thereby assuring that no pulses are generated until the overload condition is removed thereby avoiding repeated switching on and off of said overload protection devices.

2. A circuit in accordance with claim 1 and further comprising:

a second comparison stage having the actual value of the load current and a reference value as inputs and providing an output signal when the difference between the actual value and the reference value exceed a predetermined limit; and a trouble alarm device having the output signal of the second comparison stage as an input.

3. A circuit in accordance with claim 2 and further comprising:

a delay stage having the output of the second comparison stage as an input and having a delayed output signal; and a disconnecting device coupled to the input of the DC control circuit and having the output signal of the delay stage as an input.

* * * * *